Aug. 28, 1962  R. H. TWYFORD  3,050,938
ROCKET NOZZLES
Filed Nov. 12, 1958  2 Sheets-Sheet 1

INVENTOR
Robert H. Twyford

BY Martha L. Ross
AGENT

Aug. 28, 1962 R. H. TWYFORD 3,050,938
ROCKET NOZZLES
Filed Nov. 12, 1958 2 Sheets-Sheet 2
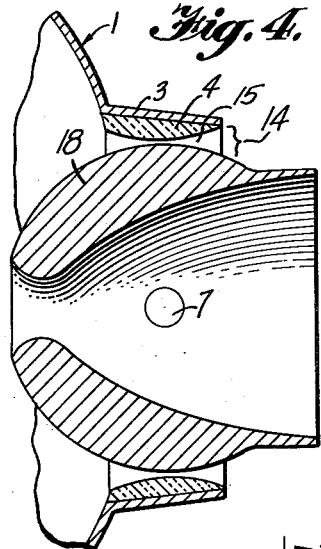
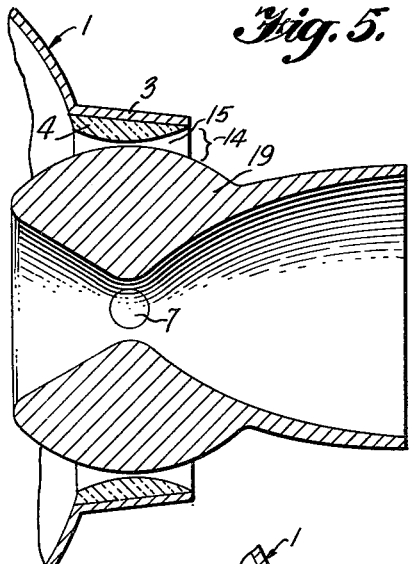
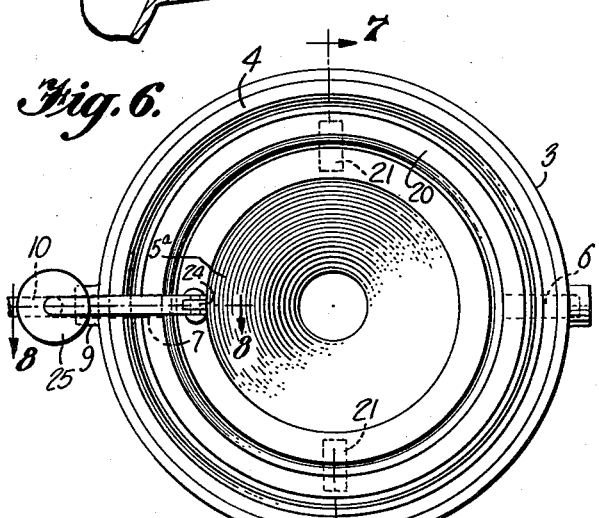
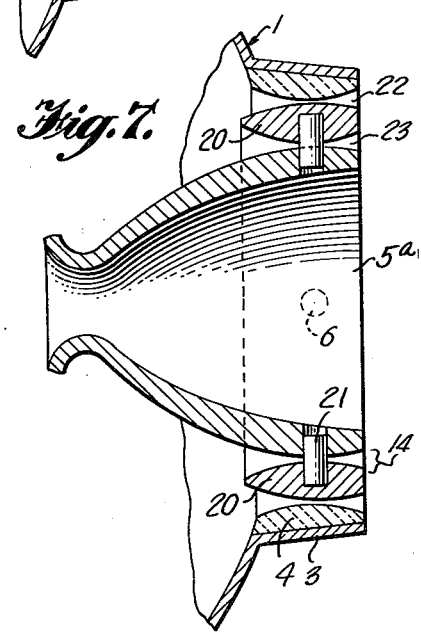
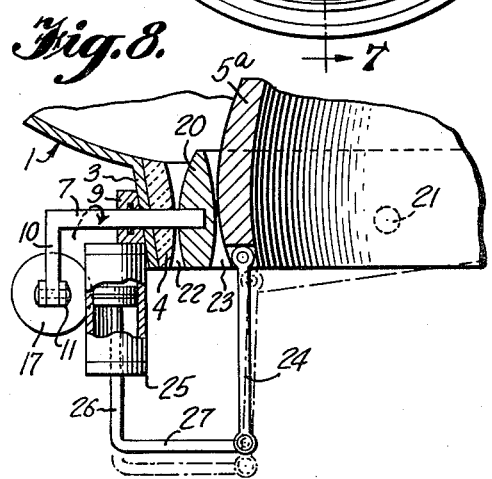
INVENTOR
Robert H. Twyford
BY Martha L. Ross
AGENT

United States Patent Office 3,050,938
Patented Aug. 28, 1962

3,050,938
ROCKET NOZZLES
Robert H. Twyford, Alexandria, Va., assignor to Atlantic Research Corporation, Alexandria, Va., a corporation of Virginia
Filed Nov. 12, 1958, Ser. No. 773,521
3 Claims. (Cl. 60—35.55)

This invention relates to controlled jet motors and particularly jet motors having thrust vectoring or swivel type exhaust nozzle systems.

Such jet motors of this general type as are known, provide a movable friction joint between the wall of the combustion chamber and the contiguous surface of the nozzle, which joint must be reasonably free in order to maintain its freedom of movement under conditions of thermal expansion since control forces available for deflecting the nozzle are generally small and the friction in the joint must be kept low enough to ensure operation.

A joint having the degree of freedom usually required is subject to more or less extensive leakage of high temperature, high pressure gas from the combustion chamber, which through heat corrosion may channel the joint at any point or points in its circumference, producing random jets which may issue angularly to the direction of normal thrust and cause uncontrolled deviation in the course of the rocket. Such heat corrosion also incapacitates the rocket for reuse.

The general object of the invention is to provide a jet motor of the deflectable exhaust nozzle type in which the movable joint between the deflectable nozzle and the wall of the combustion chamber is substituted by an annular nozzle surrounding the deflectable nozzle, the outer annular component of the annular nozzle being immovably fixed to the wall of the combustion chamber, therefore free from leakage, and the external face of the deflectable nozzle constituting the inner surface of the annular nozzle. By this arrangement the entire mass of gas in the high pressure gas or combustion chamber is converted into the kinetic energy of the jets from the nozzles without leakage loss and without corrosive deterioration between the wall of the combustion chamber and the outer component of the annular nozzle since there is no friction joint to give rise to leakage.

Another object of the invention is to provide a jet motor having the annular exhaust nozzle and deflectable central exhaust nozzle as above described, in which the internal geometry of the annular nozzle is so that the contour of said throat, remains the same throughout the practical range of deflection of the central nozzle. This is accomplished by providing the external surface of the central nozzle, in that region which forms one side of the throat, with a spherical contour centered at the axis of rotation of the central nozzle, and results in the annular jet issuing from said throat having all of its elements symmetrical about the axis of said jet so that its axis is parallel to the axis of normal thrust, there being no unbalanced force inherent in the annular jet to produce a deflective movement of the rocket.

A further object of the invention is the provision of a jet motor, as described, in which the central nozzle is so mounted as to give it universality of angular movement, within its range of deflection.

Other objects of the invention will appear as the following description of practical embodiments thereof proceeds.

In the drawings which accompany and form a part of the following specification and throughout the figures of which the same reference characters denote identical parts.

FIGURES 4 and 5 are longitudinal sectional views showing modified forms of deflectable nozzles pivoted in the throat of the annular nozzle, and extending different distances outwardly of the combustion chamber.

FIGURE 6 is a modified form of the invention showing, in end elevation, a deflectable nozzle universally mounted.

FIGURE 7 is a view in section taken along the line 7—7 of FIGURE 6.

FIGURE 8 is a view in section taken along the line 8—8 of FIGURE 6.

Figure 1:
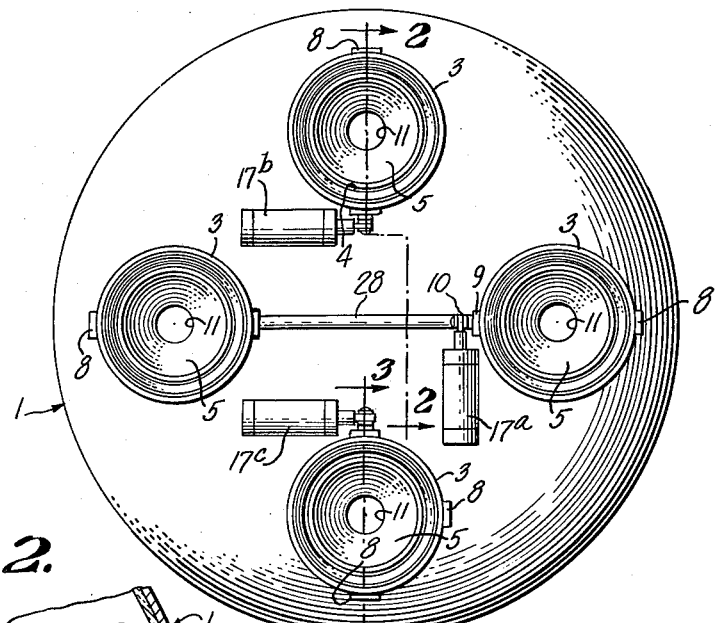
FIGURE 1 is an end elevational view of a jet motor showing four exhaust nozzles.
Figure 2:
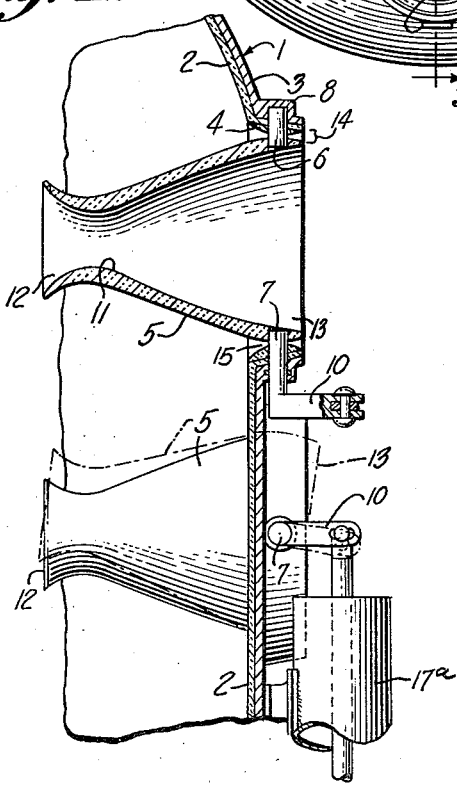
FIGURE 2 is a sectional view taken along the line 2—2 of FIGURE 1.
Figure 3:
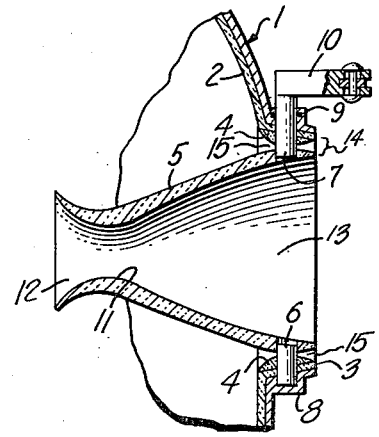
FIGURE 3 is a view in section taken along the line 3—3 of FIGURE 1.

Referring now in detail to the drawings and first adverting to that form of the invention shown in FIGURES 1—3 inclusive, the combustion chamber or plenum confining the high pressure gases 1, as shown, is of metal and has an insulation liner 2, which protects the metal from becoming overheated with the risk of bursting or melting. The discharge end of the combustion chamber is formed with openings surrounded by rearwardly extending outwardly convergent annular flanges 3, constituting supports for the exhaust nozzle structure, four nozzles being shown. The shell and the liner will together be considered and referred to as the wall of the combustion chamber, and it may here be stated that the liner is to be regarded as the equivalent of any type of thermal protection for the shell, including the cooling systems such as are generally employed in rockets burning liquid propellant.

It will be understood that high pressure gases can be generated in the combustion chamber of the illustrative embodiment in any desired manner, as by burning of a solid or liquid propellant or by combustion of a fuel by means of air, as in a ram jet engine. It will also be understood that the invention is sufficiently comprehensive to embrace a jet motor operated by gases, such as, steam, introduced into the chamber or plenum under high pressure.

It is known to provide a jet motor combustion chamber with a controlled directionally swiveled nozzle to obtain attitude control forces. In such a jet motor the mobility of the nozzle has heretofore necessitated a joint incorporating complementary fixed and movable substantially contiguous surfaces between the combustion chamber and the deflectable nozzle, for example, a joint of complementary convex and concave spherical surfaces. Since in a jet motor the moments of force which are used to control deflection are generally small, and as the high temperature tends to expand the parts and stiffen the joint, it has been necessary to make the joint-forming surfaces quite a loose or free fit, consequently leakage of some high pressure gas through the joint was inevitable, and to the extent of the leakage the joint surfaces have become quickly corroded and burned by the passing gases, further imparing the joint. The jet of escaping gases would not necessarily be uniform circumferentially all around, and being uncontrolled, various circumferential portions of the jet might issue at random in different angular directions with respect to the direction of forward thrust whereby the precision of deflection otherwise obtainable through the vectoring of the central nozzle would not be realized.

The concept of the present invention is built about the bold idea of not attempting to exclude leakage through the joint, but on the contrary, to open the joint so wide that it is no longer a joint but has become an annular nozzle, and in so designing the complementary surfaces of this nozzle that axis of the exhaust jet therefrom is parallel to the direction of normal thrust of the jet motor in all attitudes of the latter so that there is no unbalanced force component to interfere with the thrust vectoring function of the deflectable central nozzle.

In working out this concept, an annulus 4 of ceramic material, or metal resistant to high temperature, is fixedly secured to the wall of the combustion chamber within each of the flanges 3. The central nozzle 5, also of suitable refractory material or metal, is mounted within the annulus upon the diametrically opposite pins or trunnions 6 and 7, which pass through apertures in the annulus and are journaled in the surrounding flange 3. Said pins preferably do not extend all the way through the wall of the nozzle. A cap 8 sealingly encloses the outer end of pin 6. Pin 7 extends through a packing gland 9 to the outside of the combustion chamber, so that it may be connected to suitable actuating means as shown in FIGURES 1, 2 and 3.

The central nozzle 5 is venturi shaped, having a restricted throat portion 11, and flaring intake and exhaust portions 12 and 13. The central nozzle is externally reversely curved in a longitudinal direction, this being the optimum shape to resist breakage from high dominant pressure externally applied. The nozzle 5, as shown in FIGURES 2 and 3, is almost entirely within the combustion chamber, a location that somewhat improves efficiency since it reduces heat losses through the wall of the nozzle. The venturi shape of the nozzle, of course, performs its normal function of converting the high compression of the combustion chamber into high velocity of the jet.

The nozzle 5 is externally shaped symetrically with respect to its longitudinal axis and that part which is surrounded by the annulus 4 is concentric with said annulus and spaced therefrom, forming the inner boundary of an annular nozzle 14, of which the annulus 4 constitutes the outer component. The confronting surfaces of the annulus 4 and the central nozzle 5, in the zone surrounded by said annulus are respectively oppositely curved to form a venturi shaped passage 15, and the curvature of said surfaces is so designed that the internal geometry of the annular nozzle 14 is constant throughout the range of deflection of the central nozzle. This feature maintains the axis of the jet as it issues from the throat of the annular nozzle 14 inherently parallel to the axis of normal thrust throughout the range of angular deflection of the nozzle 5. For example, if the outer surface of the central nozzle, which is the inner side of the annular nozzle, is spherical about a center located in the axis of swing of the central nozzle, as shown in the drawings, the outer side of the annular nozzle could have various contours, such as spherical or cylindrical, symmetrical about the axis of the central nozzle in the region of the throat, and the condition essential for the functioning of the present invention would be met. This is what is referred to in the present specification as the internal geometry of the annular nozzle.

Another visualization of the inventive concept pictures the jet issuing from the annular nozzle as a curtain at all times surrounding the central nozzle and normally axially parallel to the axis of normal thrust; in other words, all the elements of the curtain are normally symmetrical about the axis of the annular nozzle, and this axis is parallel to the longitudinal axis of the combustion chamber and, therefore, to the normal axis of thrust. The term "normally" as here employed implies that the conditions described are inherent in the jet curtain as it issues from the throat of the nozzle, throughout the practical range of deflection of the central nozzle. Under such conditions the curtain jet has no inherent force component acting to deflect the rocket, all thrust forces being balanced about the axis of the curtain.

However, when the central nozzle is deflected, the jet therefrom impinges against the surrounding jet curtain, diverting the part of said curtain which it contacts, outwardly, thereby imparting a deflecting moment to said curtain, but this is in the same direction as the central jet and therefore assists the central nozzle in its deflecting function. If the internal geometry of the throat of the annular nozzle were such that, within the range of deflective movement of the central nozzle the axis of the curtain jet were not constantly parallel to the axis of normal thrust of the rocket, the curtain jet itself would exercise an inherent deflecting action uncoordinated with the controlled central jet and which might well be in conflict with the course of the rocket determined by the direction of the central jet.

The nozzles 5 may be so selectively controlled as to provide adjustment in pitch, roll and yaw of the jet motor. Exemplary control means are indicated in FIGURES 1 and 2 for effecting these several adjustments, the actuators as shown, being the hydraulic motors 17a, 17b and 17c, mounted on the exhaust end of the jet motor and served by fluid pressure derived from the functioning of the jet motor or from any other source. Those alternate nozzles 5 which are laterally positioned are deflectable in vertical planes, effecting pitch control. These are connected by the shaft 28, which is joined to adjacent trunnion pins 7, so that the nozzles move in unison. A crank arm 10 carried by this shaft is pivotally connected to the plunger rod of the hydraulic motor 17a.

The pair of alternate nozzles 5 which occupy upper and lower positions are separately controlled by the respective hydraulic motors 17b and 17c. Each of these nozzles has a crank arm 10 carried by its trunnion pin 7, as shown in FIGURE 3, and the crank arms all are pivotally connected respectively to the plunger rods 16 of the corresponding hydraulic motors. These nozzles are operated together in the same direction for controlling yaw, and together in opposite directions for roll control.

The fluid pressure supply conduits and the valving appurtenant thereto do not directly concern the present invention and are well within the sphere of the skilled mechanic and are, therefore, not shown. In the case of a rocket motor employing liquid propellant, the fluid pressure may be furnished to the motors 17 by the turbopump which pressurizes the propellent supply to the combustion chamber. In the form of the invention illustrated in FIGURES 1 to 3, inclusive, the movement of all of the deflectable nozzles is restricted to planes, perpendicular to the axes of the trunnions.

FIGURES 4 and 5 illustrate deflectable nozzles 18 and 19, which are incidentally of slightly different shape, and which are pivotally mounted in the throat of the outer annular component 4 of the annular nozzle 14 on trunnions, one of which is designated by the numeral 7. These figures are introduced principally to show nozzles in which the pivotal axis is shifted toward the anterior end of the nozzle from its position shown in FIGURES 1 to 3, so that less of the nozzle is within the combustion chamber and more of it extends beyond the rearward end of the combustion chamber. This arrangement may, in some instances, have advantages over the mounting shown in FIGURES 1 to 3, one being that the central nozzle is pivoted closed to its center of gravity and, therefore, smaller movements of force are required to deflect it.

Referring now to FIGURES 6, 7 and 8, the modification of the invention disclosed therein has the same purpose as that shown in FIGURES 1, 2 and 3 insofar as it substitutes for a mobile joint between the combustion chamber and deflectable nozzle, subject to leakage, an annular nozzle of which the inner component is itself a deflectable nozzle, and in addition it provides a central nozzle universally deflectable within its range of movement. This arrangement involves the provision of an additional ring 20 between the outer component 4 of the annular nozzle 14 and the central nozzle, the latter, in FIGURES 6, 7 and 8, being given a new reference designation 5a, since it is not identical with the nozzle 5, having the added function of universaility of movement. The ring 20 is supported by the diametrically opposite trunnions 6 and 7, while the central nozzle is mounted upon the trunnions 21 carried by the ring 20 on a diametrical axis perpendicular to the axis of the trunnions 6 and 7.

The ring 20 is formed both on its outer and inner circumferential faces with curved surfaces complementary respectively to the adjacent faces of the outer component 4 and the central nozzle 5a, forming the respective outer and inner annular nozzles 22 and 23, which have the curvature of their passage forming faces so designed that the internal geometry of said nozzles is constant throughout the small angles within the range of deflection of the intermediate ring 20 and the central nozzle 5a.

It is to be noted that a generic relationship exists between the form of invention disclosed in FIGURES 1, 2 and 3, and the modification illustrated in FIGURES 6, 7 and 8, in that the ring 20, together with the central nozzle 5a, may be considered the counterpart of the central nozzle 5 of the first-described form of the invention, since they constitute the deflectable unit of the nozzle structure while the outer face of the ring 20 forms the internal surface of annular nozzle 14, cooperating with the fixed component 4.

The means for operating the deflectable nozzles 23 and 5a are indicated in FIGURES 6 and 8. The trunnion 7, which is fixed to the ring 20, and passes through the fixed component 4, the flange 3 of the combustion chamber and the stuffing box 9, has the crank arm 10 linked to the plunger rod 11 of the hydraulic motor 17 in the same manner as appertains to the operating means for the nozzle 5 in FIGURE 3. The central nozzle 5a is operated by a link 24 extending outwardly from the periphery of the exit end of the nozzle 5a, pivotally connected to said nozzle. A hydraulic motor 25 has a plunger rod 26 extending outwardly substantially parallel to the link 24, having a laterally bent portion 27, which bridges the jets from the annular nozzles at one side, to which the link 24 is pivotally connected. The hydraulic motors may be powered by fluid pressure from a turbo-pump or other selected source, and are generally operated in controlled unison, by means not shown.

It will be understood by those skilled in the art that the specific details of construction and arrangement of parts, as herein described, are by way of illustration and not to be necessarily construed as limiting the scope of the invention.

I claim:

1. In a jet motor, a chamber for confining the high pressure gases from which thrust is derived, a deflectable exhaust nozzle, and an annular exhaust nozzle surrounding said deflectable nozzle, said nozzles each communicating directly with said chamber in parallel relation, said annular nozzle having an outer component sealingly fixed to the wall of said chamber, within which component said deflectable nozzle is swingably mounted on a transverse axis, the exterior wall of said deflectable nozzle being the inner wall of said annular nozzle, the outer wall of said deflectable nozzle in the throat region of said annular nozzle having a spherical contour centered at a point in the axis of swing of said deflectable nozzle whereby the axis of the annular jet remains coincident with the axis of said outer component throughout the range of deflection of said deflectable nozzle.

2. In a jet motor, a chamber for confining the high pressure gases from which thrust is derived, normally coaxial exhaust nozzles including an inner deflectable nozzle and an outer annular nozzle surrounding said deflectable nozzle, each of said nozzles being in direct communication with said chamber in parallel relation thereto, the outer wall of said deflectable nozzle being the inner wall of said annular nozzle, and the outer wall of said annular nozzle being sealingly, fixedly joined to the wall of said chamber in sealed relation to said chamber, in a position in which its axis is parallel to the longitudinal axis of said chamber, which is the axis of normal thrust, said deflectable nozzle being swingable about a transverse axis passing through the throat of said annular nozzle, the inner and outer walls of said annular nozzle being of spherical contour forming a venturi shaped throat, the spherical contour of the outer wall of said deflectable nozzle being centered at a point in the axis of swing of said deflectable nozzle.

3. In a jet motor, a chamber for confining the high pressure gases from which thrust is derived, and exhaust nozzle means therefor, the latter including an outer annular nozzle component in fixed sealed contact throughout its outer circumferential extent, with a surrounding portion of the wall of said chamber, in a position in which its axis is parallel to the longiutdinal axis of said chamber which is the axis of normal thrust, and a deflectable nozzle unit, said unit comprising a central nozzle and a ring thereabout correlated with the outer wall of said central nozzle to form therewith an inner annular nozzle, the outer wall of said ring being correlated with said outer annular nozzle component to form an outer annular nozzle, each of the aforementioned nozzles being in direct communication with said chamber in parallel relation, said ring being mounted in said outer annular nozzle component to swing on a diametrical axis, and said central nozzle being mounted in said ring to swing on a diametrical axis perpendicular to the axis of swing of said ring, whereby the central nozzle has a universal range of deflection, centered at the intersection of the swing axes, the jet from the central nozzle when the latter is in deflected attitude transmitting deflection to the parts of the surrounding annular jets against which it impinges, limited to said parts, creating thrust moments in said annular jets in the same direction as the thrust of the jet from said central nozzle, which thrust moments assist the controlled vector-varying function of said central nozzle.

References Cited in the file of this patent
UNITED STATES PATENTS

| | | |
|---|---|---|
| 1,629,767 | Valdes | May 24, 1927 |
| 2,575,735 | Servanty | Nov. 20, 1951 |
| 2,621,871 | Robert | Dec. 16, 1952 |
| 2,654,552 | Jonas | Oct. 6, 1953 |
| 2,780,059 | Fiedler | Feb. 5, 1957 |
| 2,868,478 | McCloughy | Jan. 13, 1959 |

FOREIGN PATENTS

| | | |
|---|---|---|
| 1,050,948 | France | Sept. 9, 1953 |